(No Model.)

B. F. ASPER.
CHAIN SAW.

No. 349,833. Patented Sept. 28, 1886.

Witnesses:
J. B. McGinn.
Wm. N. Peck

Benjamin F. Asper
Inventor.
by Connolly Bro

UNITED STATES PATENT OFFICE.

BENJAMIN F. ASPER, OF PITTSBURG, ASSIGNOR OF ONE-HALF TO SAMUEL McCARTER, OF NORRISTOWN, PENNSYLVANIA.

CHAIN-SAW.

SPECIFICATION forming part of Letters Patent No. 349,833, dated September 28, 1886.

Application filed October 19, 1885. Serial No. 180,249. (No model.)

*To all whom it may concern:*

Be it known that I, BENJAMIN F. ASPER, a citizen of the United States, residing at Pittsburg, in the county of Allegheny and State of Pennsylvania, have invented a certain new and useful Chain-Saw; and I do hereby declare the following to be a full, clear, and exact description of the invention, reference being had to the accompanying drawings, which form part of this specification, in which—

Figure 1:
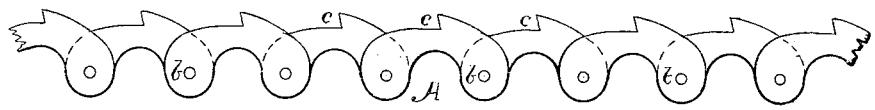
Figure 2:
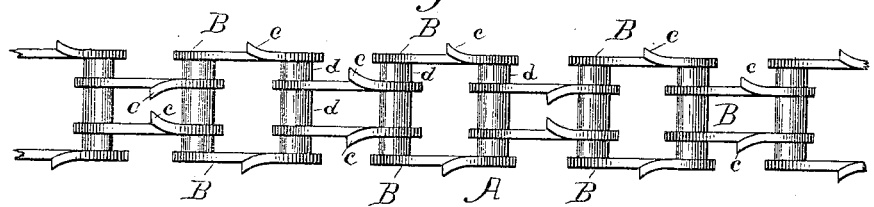
Figure 3:
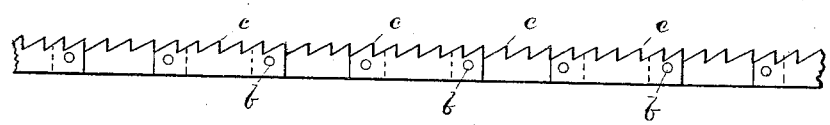

Figure 1 is a side view of the saw. Fig. 2 is a plan view. Fig. 3 is a side view of a modification.

My invention has for its object to provide a new device or article for sawing or kerfing materials of different kinds, such as wood, ice, stone, &c., and susceptible of use under conditions where it would not be practicable to employ a saw.

My invention consists of a saw-chain or chain-saw composed of a series of links jointed or united to form a chain, said links having teeth which act as cutters.

Referring to the accompanying drawings, A designates the chain-saw or saw-chain which constitutes my invention, and is composed of links B B B, which are jointed together at their ends by means of lateral rivets or pivot-pins *b b*. These links consist of suitable metal, preferably steel, in the form of plates having teeth *c c c* projecting from their outer edges. The links are arranged to break joints, as shown, so that the teeth of any one pair of links will not be aligned with the teeth of the next pair, and the teeth are "set," like saw-teeth, inclining alternately in opposite directions. Each joint of the chain may consist of one, two, or more link-plates—that is, all joints have the same number of links, or, if desired, alternate joints may vary in the number of their links, having respectively two links and three links apiece, or two links and one link, or more. Where each joint of the chain consists of two plates and their pivots, these may be arranged as shown in the drawings, one pair being widely separated laterally and the next pair close together, forming alternate outside and inside links. In this arrangement the teeth of all the outside links are set outwardly, while those of the inside links alternate in their set; but this may be varied by giving an alternate inward and outward set to the teeth of the outside links.

To use this chain-saw or saw-chain it is placed upon suitable pulleys in such manner that the teeth will project outwardly. Motion being imparted, so as to cause said chain to run on the pulleys, it is presented to the material to be cut, or the material to be cut is presented to it in the manner of sawing with a circular saw or band-saw. Combined with suitable mechanism for feeding it forwardly, the chain-saw or saw-chain may be used under conditions and with results not practicable with an ordinary saw. It is in effect a flexible saw, capable of indefinite extension lengthwise and diametrically. Any of its component parts or links may, in case of accident or breakage, be removed or replaced at slight expense without incurring the loss of the whole article. If it be desired to render the chain inflexible, the pivot-pins which unite the links and the openings therefor in the latter may be made angular, which will prevent the links from turning.

Where the device is used to make a saw-cut, the links will rest side by side or touch laterally at their ends; but where it is desired to plow a groove or make a wide kerf the links may be spread laterally or separated by dividers consisting of washers *d d* on the pivot-pins *b b*.

What I claim as my invention is—

1. A chain-saw composed of toothed links and pivot-rods, with washers arranged between said links, each of said links consisting of a single plate of metal having a tooth formed integral therewith and set or turned over obliquely from the plane of the link, as set forth.

2. A chain-saw composed of links arranged in separate parallel rows and combined with pivots and washers or collars, the said pivots or pivot-pins connecting the links laterally, uniting the rows and forming a continuous chain, the links of the two outer rows being formed with outwardly-canting teeth, while those of the inner rows project inwardly and toward each other, said outer and inner links being arranged in alternate series, or so as to break joints, substantially as described.

In testimony that I claim the foregoing I have hereunto set my hand this 26th day of August, 1885.

BEN. F. ASPER.

Witnesses:
M. D. CONNOLLY,
WILL H. POWELL.